US010172118B2

United States Patent
Zeng et al.

(10) Patent No.: US 10,172,118 B2
(45) Date of Patent: Jan. 1, 2019

(54) DECOUPLED MODE FOR A COMMON UPLINK BURST TRANSMISSION IN A TIME DIVISION DUPLEX SUBFRAME STRUCTURE

(71) Applicant: QUALCOMM Incorporated, San Diego, CA (US)

(72) Inventors: Wei Zeng, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 15/202,314

(22) Filed: Jul. 5, 2016

(65) Prior Publication Data
US 2017/0171856 A1 Jun. 15, 2017

Related U.S. Application Data

(60) Provisional application No. 62/265,313, filed on Dec. 9, 2015.

(51) Int. Cl.
*H04W 4/00* (2018.01)
*H04W 72/04* (2009.01)
(Continued)

(52) U.S. Cl.
CPC ........ *H04W 72/0413* (2013.01); *H04B 1/707* (2013.01); *H04B 7/0413* (2013.01);
(Continued)

(58) Field of Classification Search
CPC ............ H04W 72/0413; H04W 72/042; H04L 5/0007; H04L 5/005; H04L 5/14;
(Continued)

(56) References Cited

U.S. PATENT DOCUMENTS

2010/0311357 A1* 12/2010 Asanuma ............. H04B 7/0632
  455/101
2012/0051319 A1* 3/2012 Kwon ............... H04W 72/0406
  370/329
(Continued)

FOREIGN PATENT DOCUMENTS

EP        2738991 A2    6/2014
WO   WO-2009150177 A2   12/2009
WO   WO-2010134755 A2   11/2010

OTHER PUBLICATIONS

International Search Report and Written Opinion—PCT/US2016/064837—ISA/EPO—dated Mar. 14, 2017.

*Primary Examiner* — Clemence S Han
(74) *Attorney, Agent, or Firm* — Loza & Loza, LLP

(57) ABSTRACT

Various aspects of the present disclosure provide for methods, apparatus, and computer software for transmitting a common uplink burst in time division duplex (TDD) carriers. The common uplink burst includes a sounding reference signal (SRS) transmitted separate from (e.g., decoupled from) a demodulation reference signal (DM-RS). At least one symbol in the common uplink burst includes a control region for carrying control information and a data region for carrying data information. The SRS may be precoded separately from precoding of the control and data regions, so that the control and/or data information may be transmitted utilizing multiple input multiple output (MIMO).

20 Claims, 10 Drawing Sheets

(51) Int. Cl.
*H04L 27/26* (2006.01)
*H04N 19/159* (2014.01)
*H04B 1/707* (2011.01)
*H04B 7/0413* (2017.01)
*H04B 7/0456* (2017.01)
*H04L 1/00* (2006.01)
*H04L 5/00* (2006.01)
*H04L 5/14* (2006.01)

(52) U.S. Cl.
CPC ......... *H04B 7/0456* (2013.01); *H04L 1/0018* (2013.01); *H04L 5/005* (2013.01); *H04L 5/0007* (2013.01); *H04L 5/14* (2013.01); *H04L 27/2613* (2013.01); *H04N 19/159* (2014.11); *H04W 72/042* (2013.01)

(58) Field of Classification Search
CPC ..... H04L 1/0018; H04B 1/707; H04B 7/0456; H04B 7/0413; H04N 19/159
See application file for complete search history.

(56) References Cited

U.S. PATENT DOCUMENTS

| | | | |
|---|---|---|---|
| 2013/0053083 A1* | 2/2013 | Suh | H04L 5/0007 455/509 |
| 2013/0107746 A1* | 5/2013 | Wang | H04L 5/0023 370/252 |
| 2013/0136199 A1* | 5/2013 | Wan | H04L 5/005 375/260 |
| 2014/0185530 A1* | 7/2014 | Kuchibhotla | H04W 4/90 370/329 |
| 2015/0237626 A1 | 8/2015 | Li et al. | |
| 2015/0282158 A1 | 10/2015 | Chen et al. | |
| 2015/0312009 A1 | 10/2015 | Nissila et al. | |
| 2016/0007269 A1 | 1/2016 | Chae et al. | |
| 2016/0249348 A1* | 8/2016 | Kang | H04L 5/0048 |
| 2016/0323874 A1* | 11/2016 | Pajukoski | H04L 5/001 |
| 2017/0135091 A1* | 5/2017 | Han | H04W 72/0413 |
| 2017/0164352 A1* | 6/2017 | Yang | H04W 72/0413 |

\* cited by examiner

DECOUPLED MODE FOR A COMMON UPLINK BURST TRANSMISSION IN A TIME DIVISION DUPLEX SUBFRAME STRUCTURE

PRIORITY CLAIM

This application claims priority to and the benefit of provisional patent application No. 62/265,313 filed in the United States Patent and Trademark Office on Dec. 9, 2015, the entire content of which is incorporated herein by reference as if fully set forth below in its entirety and for all applicable purposes.

TECHNICAL FIELD

Aspects of the present disclosure relate generally to wireless communication systems, and more particularly, to the channel structure for uplink transmissions in a time division duplex (TDD) subframe.

INTRODUCTION

Wireless communication networks are widely deployed to provide various communication services such as telephony, video, data, messaging, broadcasts, and so on. Such networks, which are usually multiple access networks, support communications for multiple users by sharing the available network resources.

Within such wireless networks a variety of data services may be provided, including voice, video, and emails. More recently, wireless communication networks are being utilized for an even broader range of services, including mission critical applications and remote control applications such as tele-surgery, where real-time feedback is necessary. In such applications, very low latency is critical to enable a suitably high quality of service. That is, the time for information to be transmitted from a communication device, and a response received back at the communication device, may need to be extremely rapid, on the order of milliseconds.

As the demand for mobile broadband access continues to increase, research and development continue to advance wireless communication technologies not only to meet the growing demand for mobile broadband access, but to advance and enhance the user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for methods, apparatus, and computer software for wireless communication utilizing a common uplink burst, by employing a decoupled mode.

One aspect of the disclosure provides a method operable at a subordinate entity for wireless communication over a time division duplex (TDD) carrier. According the method, a subordinate entity transmits an uplink burst within a downlink-centric subframe and an uplink-centric subframe on the TDD carrier. The uplink burst includes a first symbol and a second symbol. The first symbol includes a sounding reference signal (SRS) configured to enable sounding of the TDD carrier. The second symbol includes information bits and a demodulation reference signal (DM-RS). The DM-RS is configured to enable demodulation of the information bits carried within the second symbol.

Another aspect of the disclosure provides a subordinate entity configured for wireless communication over a TDD carrier. The subordinate includes a processor, a memory communicatively coupled to the processor, and a transceiver communicatively coupled to the processor. The processor and the memory are configured to transmit an uplink burst within a downlink-centric subframe and an uplink-centric subframe on the TDD carrier. The uplink burst includes a first symbol and a second symbol. The first symbol includes an SRS configured to enable sounding of the TDD carrier. The second symbol includes information bits and a DM-RS. The DM-RS is configured to enable demodulation of the information bits carried within the second symbol.

Another aspect of the disclosure provides a subordinate entity configured for wireless communication over a TDD carrier. The subordinate entity includes means for transmitting an uplink burst within a downlink-centric subframe and an uplink-centric subframe on the TDD carrier. The uplink burst includes a first symbol and a second symbol. The first symbol includes an SRS configured to enable sounding of the TDD carrier. The second symbol includes information bits and a DM-RS. The DM-RS is configured to enable demodulation of the information bits carried within the second symbol.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
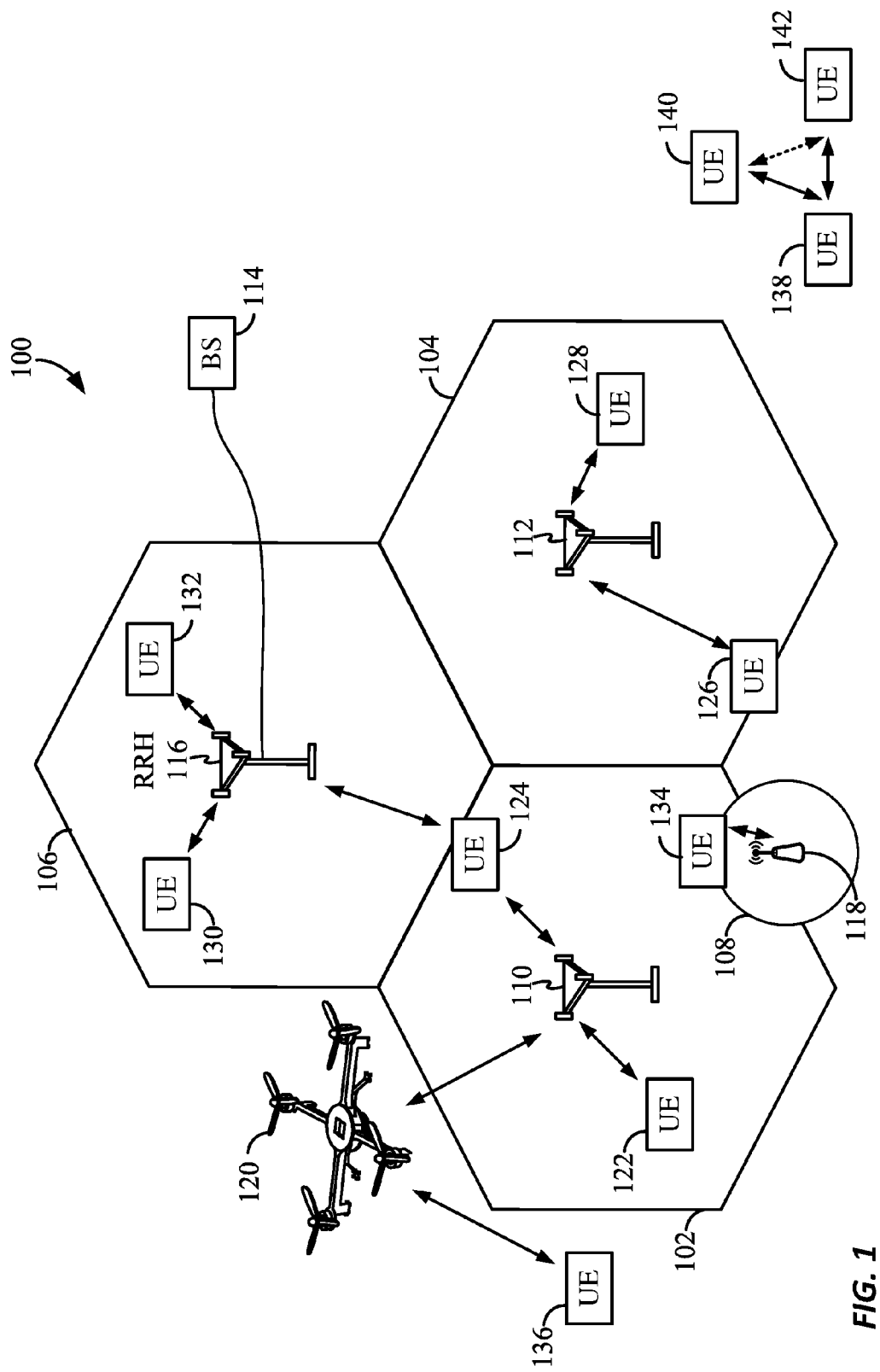
FIG. 1 is a schematic diagram of a wireless communication network according to some embodiments of the disclosure.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity 138.

Figure 2:
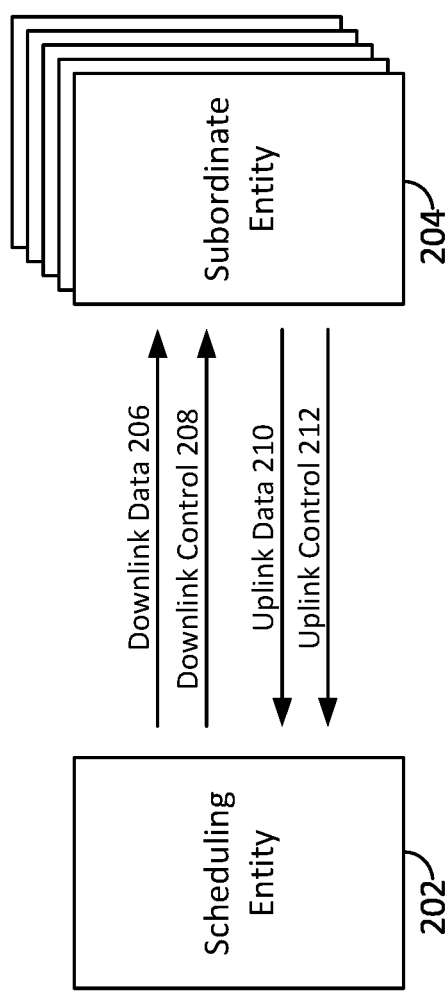
FIG. 2 is a schematic block diagram illustrating a scheduling entity in communication with a plurality of subordinate entities according to some embodiments of the disclosure.

Thus, in a wireless communication network with a scheduled access to time—frequency resources and having a cellular configuration, a P2P configuration, and a mesh configuration, a scheduling entity and one or more subordinate entities may communicate utilizing the scheduled resources. Referring now to FIG. 2, a block diagram illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

Furthermore, the subordinate entities 204 may transmit uplink control information 212 to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

Figure 3:
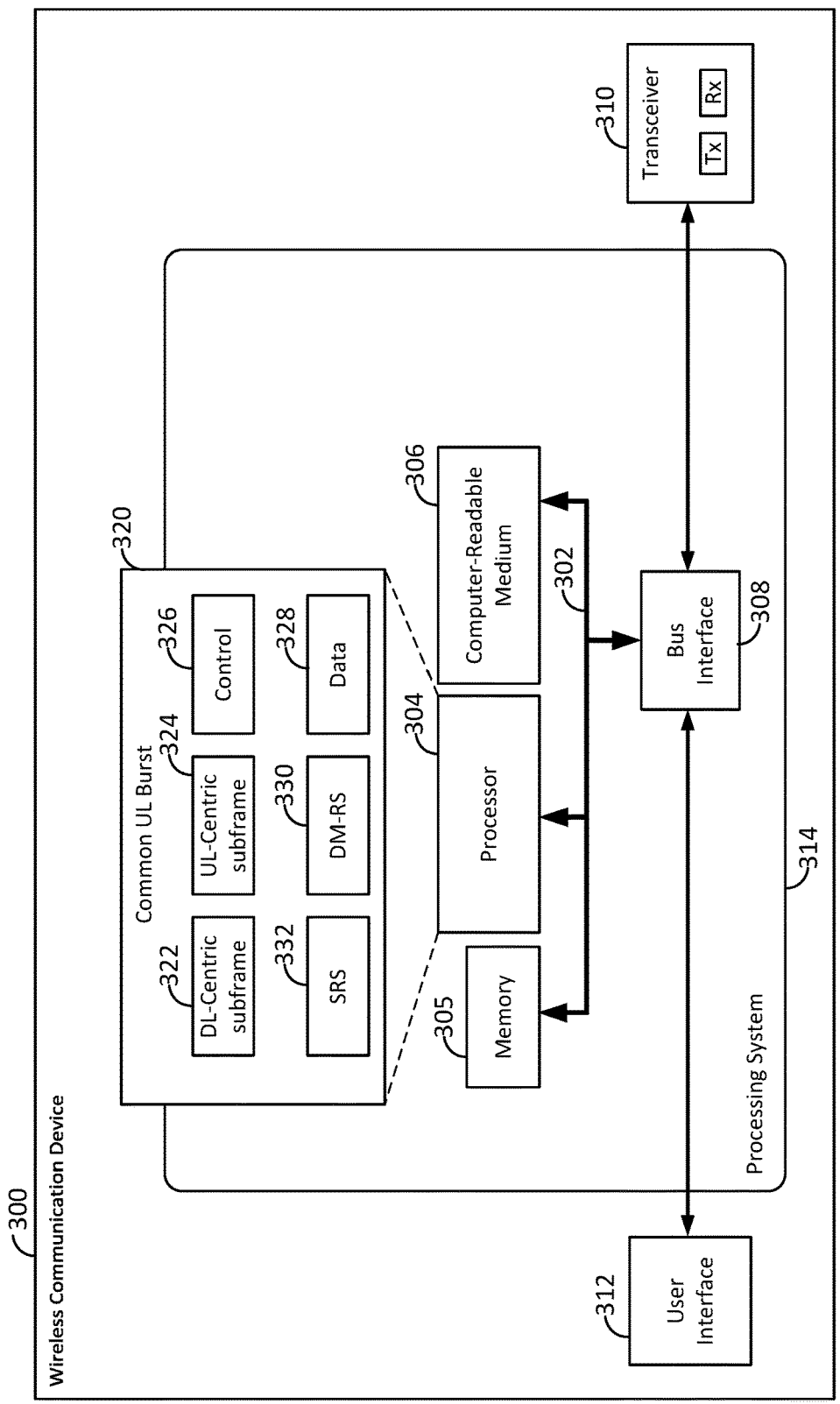
FIG. 3 is a block diagram illustrating an example of a wireless communication device according to some embodiments of the disclosure.
Figure 4:
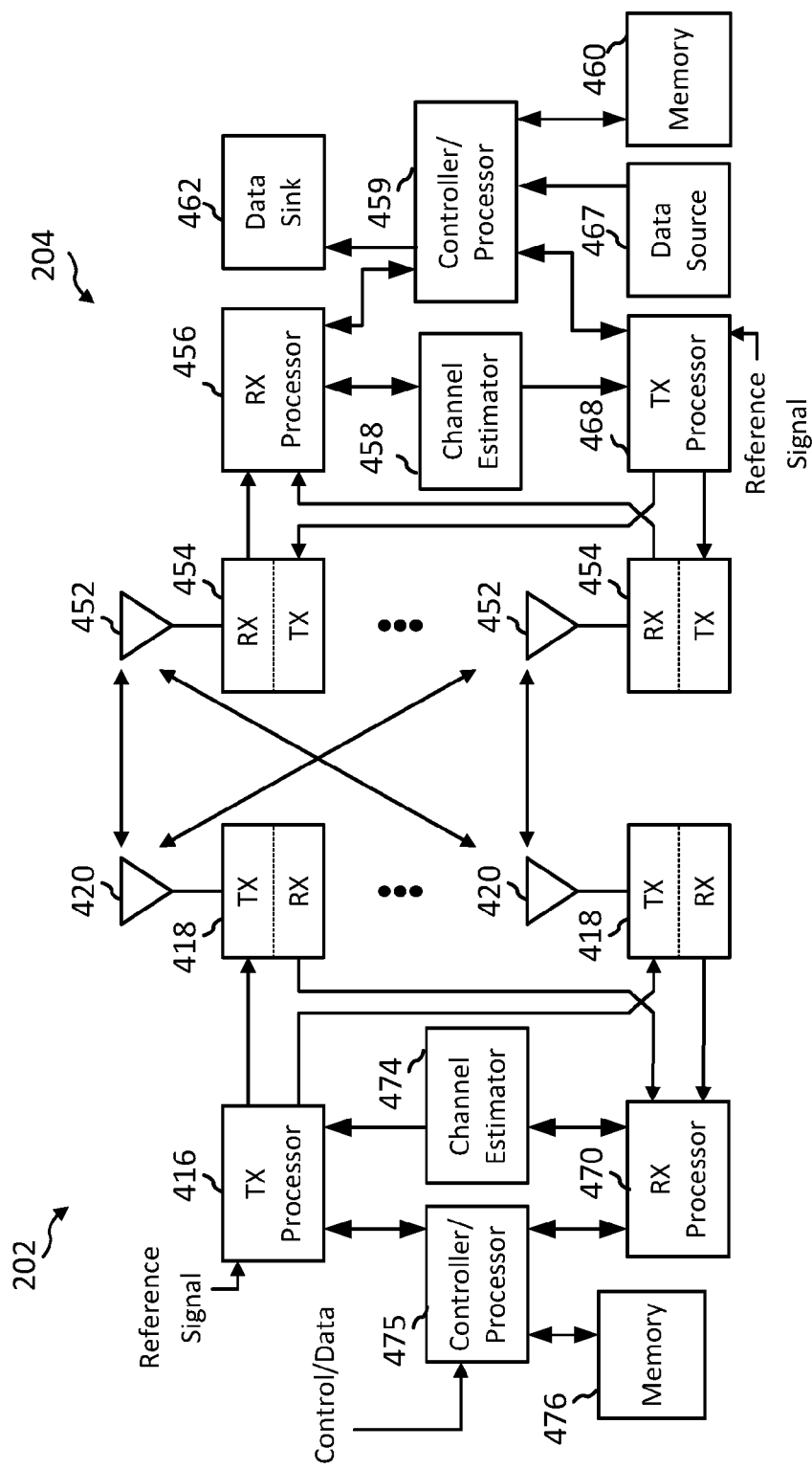
FIG. 4 is a block diagram illustrating further detail of a scheduling entity in communication with a subordinate entity according to some embodiments of the disclosure.

FIG. 3 is a conceptual diagram illustrating an example of a hardware implementation for a wireless communication device 300 employing a processing system 314. In accordance with various aspects of the disclosure, an element, or any portion of an element, or any combination of elements may be implemented with a processing system 314 that includes one or more processors 304. For example, the wireless communication device 300 may be a scheduling entity 202, base station (BS) 102, or any other suitable network node, as illustrated in FIGS. 1, 2, 4, and/or 8. Furthermore, the wireless communication device 300 may be a subordinate entity 204, a UE 126 or 128, an IoE device, or any other suitable network node, as illustrated in FIGS. 1, 2, 4, and/or 8. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 304, as utilized in a wireless communication device 300, may be used to implement any one or more of the processes described in the present disclosure.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and one or more transceivers 310. The transceivers 310 provide a communication interface or means for communicating with various other apparatus over a transmission medium. In various examples, the transceivers 310 may include one or more antennas, and in multi-antenna examples, may be enabled to determine an angle from which a received signal arrives, or for beamforming of transmitted signals. The transceiver 310 may include various sub-components configured to enable wireless communication, including but not limited to one or more power amplifiers, a transmitter, a receiver, filters, oscillators, etc. Further, depending upon the nature of the apparatus, a user interface 312 (e.g., keypad, display, speaker, microphone, joystick, etc.) may also be provided.

In some aspects of the disclosure, the processor 304 may include a common uplink (UL) burst block 320 that can be configured to perform various functions for a common UL burst described in relation to FIGS. 5-10. For example, the common UL burst block 320 may include one or more functional blocks or components, for example, a DL-centric subframe block 322, an UL centric subframe block 324, a control information block 326, a data information block 328, a demodulation reference signal (DM-RS) block 330, and a sounding reference signal (SRS) block 332. The common UL burst block 320 may be configured by executing code, for example, common UL burst communication code stored in the computer-readable medium 306.

Figure 5:
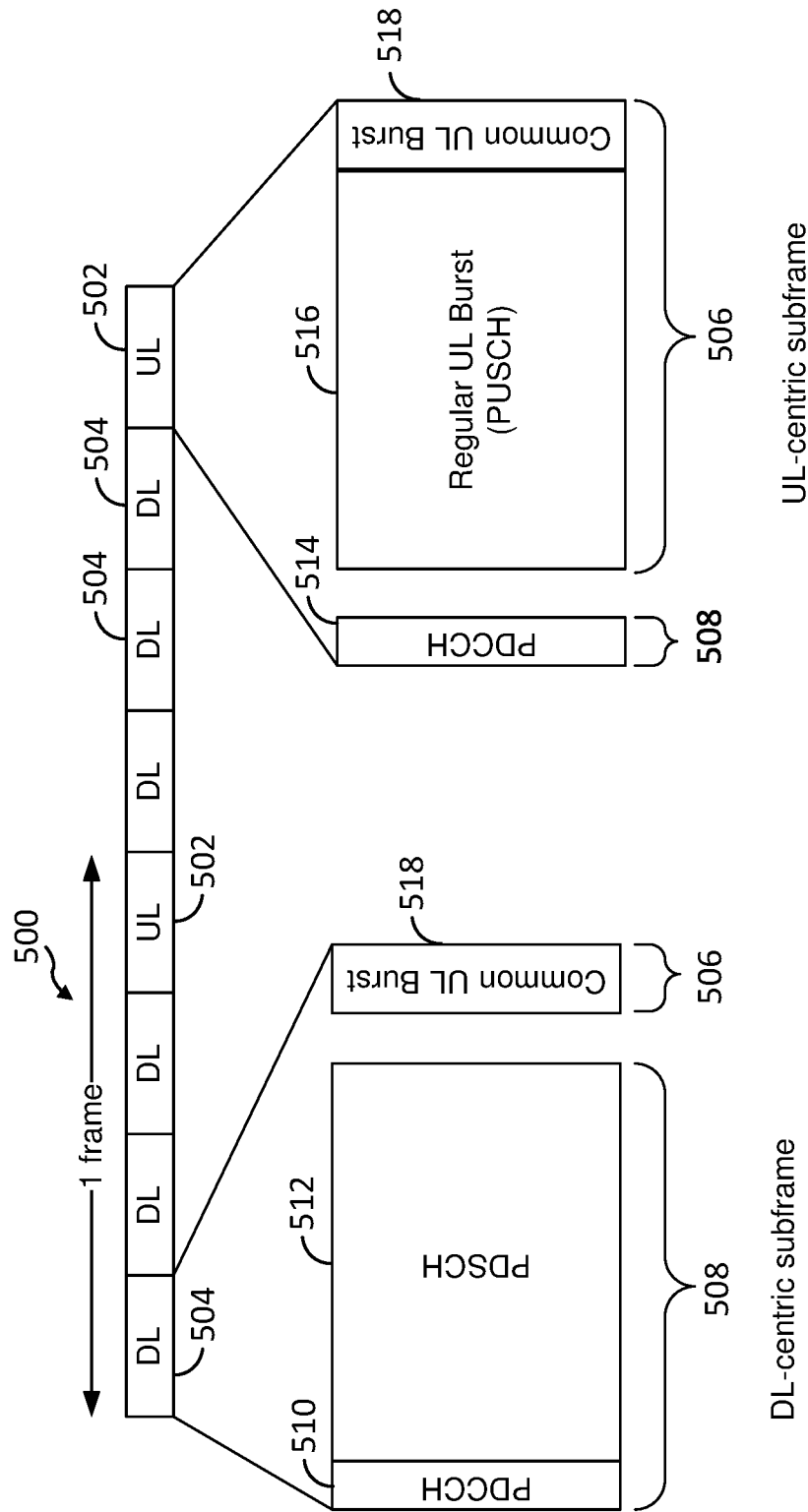
FIG. 5 is a schematic diagram illustrating a downlink-centric subframe and an uplink-centric subframe each including a common uplink burst according to some embodiments of the disclosure.

The DL-centric subframe block 322 may be configured to perform functions for handling DL-centric subframe communication: for example, transmitting, receiving, and/or scheduling one or more DL-centric subframes 504 (see FIG. 5). The UL-centric subframe block 324 may be configured to perform functions for handling UL-centric subframe communication: for example, transmitting, receiving, and/or scheduling one or more UL-centric subframes 502 (see FIG. 5). The control information block 326 may be configured to handle control information, for example, transmitting, receiving, and/or scheduling a scheduling request (SR), an acknowledgment (ACK)/negative acknowledgment (NACK), and other control signals in a common UL burst. The data information block 328 may be configured to handle data information, for example, transmitting, receiving, and/or scheduling a physical uplink shared channel (PUSCH) or other user data. The DM-RS block 330 may be configured to perform functions related to the DM-RS as described in relation to FIGS. 5-10. The SRS block 332 may be configured to perform functions related to the SRS as described in relation to FIGS. 5-10.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

FIG. 4 is a block diagram showing additional details of one example of a scheduling entity 202 in communication with one example of a subordinate entity 204 in an access network. In the DL, upper layer packets from the core network are provided to a controller/processor 475. The controller/processor 475 implements the functionality of the L2 layer. In the DL, the controller/processor 475 provides header compression, ciphering, packet segmentation and reordering, multiplexing between logical and transport channels, and radio resource allocations to the subordinate entity 204 based on various priority metrics. The controller/processor 475 is also responsible for hybrid automatic repeat request (HARQ) operations, retransmission of lost packets, and signaling to the subordinate entity 204.

The transmit (TX) processor 416 implements various signal processing functions for the L1 layer (i.e., physical layer). The signal processing functions include coding and interleaving to facilitate forward error correction (FEC) at the subordinate entity 204 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the subordinate entity 204. Each spatial stream may then be provided to a different antenna 420 via a separate transmitter 418TX. Each transmitter 418TX may modulate a radio frequency (RF) carrier with a respective spatial stream for transmission.

At the subordinate entity 204, each receiver 454RX receives a signal through its respective antenna 452. Each receiver 454RX recovers information modulated onto an RF carrier and provides the information to the receive (RX) processor 456. The RX processor 456 implements various signal processing functions of the L1 layer. The RX processor 456 may perform spatial processing on the information to recover any spatial streams destined for the subordinate entity 204. If multiple spatial streams are destined for the subordinate entity 204, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the scheduling entity 202. These soft decisions may be based on channel estimates computed by the channel estimator 458. The soft decisions are then decoded and deinterleaved to recover the data and control signals that were originally transmitted by the scheduling entity 20 on the physical channel. The data and control signals are then provided to the controller/processor 459.

The controller/processor 459 implements the L2 layer. The controller/processor can be associated with a memory 460 that stores program codes and data. The memory 460 may be referred to as a computer-readable medium. In the UL, the controller/processor 459 provides demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection using an acknowledgement (ACK) and/or negative acknowledgement (NACK) protocol to support HARQ operations.

In the UL, a data source 467 is used to provide upper layer packets to the controller/processor 459. The data source 467 represents all protocol layers above the L2 layer. Similar to the functionality described in connection with the DL transmission by the scheduling entity 202, the controller/processor 459 implements the L2 layer for the user plane and the control plane by providing header compression, ciphering, packet segmentation and reordering, and multiplexing between logical and transport channels based on radio resource allocations by the scheduling entity 202. The controller/processor 459 is also responsible for HARQ operations, retransmission of lost packets, and signaling to the scheduling entity 202.

Channel estimates derived by a channel estimator 458 from a reference signal or feedback transmitted by the scheduling entity 202 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the scheduling entity 202 in a manner similar to that described in connection with the receiver function at the subordinate entity 204. Each receiver 418RX receives a signal through its respective antenna 420. Each receiver 418RX recovers information modulated onto an RF carrier and provides the information to a RX processor 470. The RX processor 470 may implement the L1 layer.

The controller/processor 475 implements the L2 layer. The controller/processor 475 can be associated with a memory 476 that stores program codes and data. The memory 476 may be referred to as a computer-readable medium. In the UL, the control/processor 475 provides demultiplexing between transport and logical channels, packet reassembly, deciphering, header decompression, control signal processing to recover upper layer packets from the subordinate entity 204. Upper layer packets from the controller/processor 475 may be provided to the core network. The controller/processor 475 is also responsible for error detection using an ACK and/or NACK protocol to support HARQ operations.

Common UL Burst on a TDD Carrier

In any wireless communication network, bi-directional communication is a desirable feature. Frequently, duplexing communication onto the air channel is accomplished utilizing frequency division duplex (FDD) or time division duplex (TDD). In FDD, a pair of carriers are used, with each respective carrier being used to carry communication signals in a different direction. In TDD, unpaired carriers are used. Here, duplexing of uplink and downlink communication is achieved by time sharing the carrier, with uplink and downlink communication occupying the carrier at different times.

In many modern wireless communication networks, significant portions of the spectrum have been allocated out by regulatory agencies in paired carriers for 1-DD. For new developing technologies, if very high bandwidth communication is desired (e.g., 100 MHz, 300 MHz, or more); however, these FDD technologies already utilize much of the spectrum, and may not be as wideband as desired for much higher data rates. At higher frequencies, including but not limited to millimeter wave (mmW) frequencies, TDD carriers may be more available. Furthermore, such TDD carriers may be less expensive for a carrier to obtain rights to use.

When utilizing a TDD carrier, communication may in some examples be organized by dividing the channel in the time domain into frames, with frames being further divided into subframes. According to an aspect of the present disclosure, subframes may take at least two general forms, referred to herein as an uplink-centric subframe structure and a downlink-centric subframe structure. Here, a downlink-centric subframe is a subframe where a majority of its time is used for communication in the downlink direction; and an uplink-centric subframe is a subframe where a majority of its time is used for communication in the uplink direction.

FIG. 5 is a schematic illustration showing a set of subframes 500 (e.g., a frame) including one uplink-centric subframe 502 every four subframes, with the remaining three out of four subframes being downlink-centric subframes 504. Of course, this particular allocation of uplink-to-downlink centric subframes is merely one example, and any proportion of uplink and downlink centric subframes may be utilized in a particular implementation.

In the illustrated examples, portions of each subframe utilized for uplink communication are called uplink portions 506, and portions of each subframe utilized for downlink communication are called downlink portions 508. Here, a gap, a guard period, a guard interval, or a guard region (not shown) may be utilized after a downlink portion and before an uplink portion, or vice versa. Such a gap may facilitate switching or reconfiguration of the RF components, including re-tuning a phase-lock loop and other radio functions.

The illustrated downlink-centric subframe 504 includes a control region 510, which may include a physical downlink control channel (PDCCH), and a data region 512, which may include a physical downlink shared channel (PDSCH). The control region 510 may include, among other things, scheduling information for informing scheduled devices (e.g., subordinate entities) which resources in the data region 512 include information for that particular device.

The illustrated uplink-centric subframe 502 also includes a control region 514, which may include a PDCCH, and a data region 516, which may include a physical uplink shared channel (PUSCH) and/or other suitable channels corresponding to an uplink data burst. The control region 514 may include, among other things, scheduling information for informing scheduled devices (e.g., subordinate entities) which resources they may utilize for uplink transmissions in the data region 516.

As illustrated in this example, both the uplink-centric subframe 502 and the downlink-centric subframe 504 include a common uplink burst portion 518. In this example, the common UL burst is shown at the end of each subframe, but it is not necessarily limited to the end, and in other examples the common UL burst 518 may appear at any suitable time within an uplink-centric subframe 502 or a downlink-centric subframe 504, including at the beginning of the subframe, or anywhere within the subframe. In some examples, the common UL burst 518 may be structured in the same way in both the uplink-centric subframes and in the downlink-centric subframes.

In an aspect of the disclosure, the common UL burst 518 may be a relatively short portion of the respective subframe, including, for example, two or more symbols. For example, a two-symbol common UL burst may have a duration of around 31 microsecond (μs). Of course, different durations, and different numbers of symbols may be included in the common UL burst within the scope of the present disclosure. That is, in a common UL burst within the scope of the present disclosure, any suitable number of symbols (e.g., OFDM symbols) may be utilized. However, for clarity, within the present disclosure, a common UL burst including two symbols is described in further detail in relation to FIGS. 6 and 7 below.

Here, the common UL burst 518 may be utilized to decouple the latency associated with a control channel carried in the common UL burst, from the uplink/downlink pattern selected in any given implementation. That is, in a TDD scheme, the downlink-centric subframes may typically appear much more frequently than the uplink-centric subframes, because more regular network traffic may typically be in the downlink direction. Further, in a typical deployment of a macrocell (e.g., an eNode B in an LTE deployment), this ratio between uplink and downlink traffic remains relatively stable over time. That is, even though any single user's UL/DL ratio may change rather drastically, when aggregated over large numbers of users, the overall ratio generally remains nearly the same. However, small cells, which unlike a macrocell, may only serve very small numbers of users, and the total ratio between UL and DL-centric subframes can largely vary over time.

Thus, depending on the cell size and the loading of the cell, the downlink and uplink patterns may change, and the ratio between uplink and downlink-centric subframes may be any suitable ratio, from one-to-one, or otherwise.

If the uplink-centric subframe is very rare, then, and downlink-centric subframes dominate, there may be a problem in that a device with critical or time-sensitive uplink information to transmit may need to wait for an extended period of time until its uplink information can be transmitted in the uplink-centric subframe. In particular, control information such as channel quality information and feedback (e.g., packet acknowledgments) may have a time-sensitive nature, and their rapid and timely transmission may be important. Therefore, including a common UL burst region in each subframe or a majority (e.g., more than 50%) of subframes, including the downlink-centric subframe, can help reduce or avoid such an extended latency for time-sensitive packets.

In a further aspect of the disclosure, such a common UL burst scheme provides for the same channel structure to be utilized in unlicensed bands as well as licensed bands. In unlicensed bands, users (e.g., subordinate entities) typically compete for resources, and are only able to reserve use of the channel for a limited time before giving up the channel for other users. Here, if a transmission is received just at the end of the time when a user has the channel, and the device loses the channel before having an opportunity to transmit an acknowledgment (or other time-critical uplink packet), the device may be required to wait for an extended period to make such transmission, until the channel can be re-acquired. However, with the common UL burst channel structure, a resource for such transmissions can be made available in every subframe, reducing or avoiding such a delay for time-critical transmissions.

The common UL burst may additionally or alternatively be utilized for the transmission of other control information, such as a scheduling request (SR). A scheduling request may be an uplink transmission of information requesting a scheduling entity (e.g., a base station or eNB) to schedule and/or allocate uplink channel resources for the scheduled device to utilize to transmit uplink data. These resources may appear within the regular UL burst region 506 illustrated in the uplink-centric subframe 502.

In still another example, the common UL burst may additionally or alternatively be utilized to carry a sounding reference signal (SRS). Within an unpaired TDD spectrum, the channel that a scheduled device (e.g., a UE or subordinate entity) sees for downlink transmissions is the same channel that a scheduling entity (e.g., an eNB) sees for uplink transmissions. Therefore, channel characterization is somewhat simplified relative to that for FDD channels. That is, the scheduling entity generally requires information about the downlink channel as seen by the receiving or subordinate entity in order to most suitably schedule resources for that user. While in an FDD channel a UE measures the channel and sends feedback to the base station to report its channel conditions; in a TDD channel, the UE may transmit the SRS in an uplink transmission, and the base station may utilize this transmission to characterize the channel on its own for scheduling downlink transmissions. This SRS transmission is generally desired to be transmitted with low latency, i.e., its transmission is somewhat time critical. Thus, placement of the SRS within the common UL burst region 518 can decouple its latency from the downlink to uplink pattern or vice versa in a given implementation.

Of course, the above are merely examples, and within the scope of the present disclosure, the common UL burst may be utilized not only for such control information, but may additionally or alternatively be utilized to carry uplink payload data with a low latency requirement. Here, such uplink payload transmissions in the common UL burst region may be limited to transmitting devices having sufficient power headroom for these transmissions.

Coupled Mode vs. Decoupled Mode

Referring once again to FIG. 1, a UE 126 is illustrated relatively far from the base station 112 (e.g., at or near a cell edge), while another UE 128 is illustrated relatively close to the base station 112 (e.g., at or near a cell center). As described further below, according to various aspects of the present disclosure, users located at the cell center similar to the UE 128 may have sufficient power headroom to include data transmissions in the common UL burst, while users located at the cell edge similar to the UE 126 may lack the power headroom to include data transmissions in the common UL burst. Accordingly, in various aspects of the disclosure, users at the cell edge may be configured to make their common UL burst transmissions in a coupled mode that facilitates coverage extension for control information transmissions, while users at or near the cell center may be configured to make their common UL burst transmissions in a decoupled mode that facilitates user data transmissions in addition to control information transmissions That is, these common UL burst regions within the subframes as described above may be configured to support all users and devices, including users near the cell center, as well as users near a cell edge. For users at or near the cell edge, whose signal may be weak because they are relatively far from the base station or scheduling entity, the content of the information within the common UL burst region may be limited to certain control information such as the packet acknowledgments (ACK) and scheduling requests (SR), which may be carried on a physical uplink control channel (PUCCH). For these users near or at the cell edge, transmissions may be made in a certain mode, referred to herein in the present disclosure as a coupled mode.

In the coupled mode, the SRS may be re-used or repurposed to serve the purpose of the demodulation reference signal (DM-RS), so that demodulation of the information bits in the common UL burst may be accomplished with the coupled SRS/DM-RS signal. That is, in coupled mode transmissions, the DM-RS (described further below, and illustrated in FIGS. 6 and 7) may be omitted. In this way, for coupled mode transmissions, the additional power that may be consumed by the transmission of the DM-RS pilot may be conserved. Thus, coupled mode transmissions may have a reduced power consumption.

On the other hand, in a decoupled mode, which may be targeted for users or devices that may be relatively close to the scheduling entity or base station, because their signal may be more easily received by the base station, these devices generally have sufficient power headroom to accommodate the additional pilot transmissions associated with the DM-RS.

Therefore, if a user or device is relatively close to the cell center or close to the base station or scheduling entity, it may be possible to accumulate or supply enough energy even during the short common UL burst to include uplink payload data in this region. Accordingly, in an aspect of the present disclosure, the decoupled mode is provided, e.g., for these users or devices that are relatively close to the cell center or close to the base station or scheduling entity.

In the decoupled mode, the UE or subordinate entity may be enabled to opportunistically transmit uplink payload data having low latency requirements. That is, by virtue of the decoupled mode, devices operating in decoupled mode may be enabled to transmit information on a PUSCH within the common UL burst region of uplink-centric subframes and downlink-centric subframes. The present disclosure refers specifically to the PUSCH, however, it is to be understood that this term is merely included for clarity, and aspects of the disclosure may utilize any suitable physical uplink channel for carrying traffic payload data.

Within the present disclosure, the name "decoupled" with reference to the decoupled mode generally refers to a decoupling of the SRS from a demodulation reference signal (DM-RS). In order to demodulate the PUCCH or PUSCH, a pilot or reference signal may be needed. Here, the DM-RS provides a pilot that may be utilized to demodulate the PUCCH/PUSCH bits. In a decoupled mode, the SRS and the DM-RS are different symbols, and may have different transmission characteristics. Thus, the SRS and DM-RS are decoupled from one another and can be beamformed or precoded differently.

In some examples, because decoupled mode users may generally be those that are close to the scheduling entity or base station, those users may utilize multiple-input multiple-output (MIMO) or other beamforming techniques in their uplink transmissions.

That is, the subordinate entities 204 (e.g., UEs 128, wireless communication devices 300, user equipment or UEs, etc.) may have multiple antennas supporting Multiple Input Multiple Output (MIMO) technology. The use of MIMO technology enables the wireless communication devices to exploit the spatial domain to support spatial multiplexing, beam-forming, and transmit diversity. Spatial multiplexing may be used to transmit different streams of data simultaneously on the same frequency. The data streams may be transmitted to a single receiving device to increase the data rate or to multiple receiving devices to increase the overall system capacity. This is achieved by spatially precoding each data stream (i.e., applying a scaling of an amplitude and a phase) and then transmitting each spatially precoded stream through multiple transmit antennas. The spatially pre-coded data streams arrive at the receiving device(s) with different spatial signatures, which enables each of the receiving devices to recover the one or more data streams destined for that device.

Spatial multiplexing is generally used when channel conditions are good. When channel conditions are less favorable, beamforming may be used to focus the transmission energy in one or more directions. This may be achieved by spatially precoding the data for transmission through multiple antennas.

Specifically referring to the common UL burst, in order to use MIMO, the transmitted information is suitably configured utilizing a certain precoding matrix. That is, in an aspect of the present disclosure, to enable MIMO or beamforming for the uplink data within the common UL burst, the uplink data transmitted within this common UL burst may be precoded utilizing a selected precoding matrix. In general, the selected precoding matrix maps data to the antennas for spatial multiplexing and/or beamforming.

However, in a further aspect of the disclosure, the SRS transmission within the common UL burst may not be beamformed or precoded for MIMO transmission. For users who wish to use MIMO in their uplink transmissions, the pilot (i.e., the SRS) generally cannot be used as the demodulation reference signal (DM-RS) for demodulating the data, since the data and the pilot use different precoding, and are accordingly beamformed differently. Therefore, the SRS and its precoding or beamforming is decoupled from the DM-RS and its precoding or beamforming.

Figure 6:
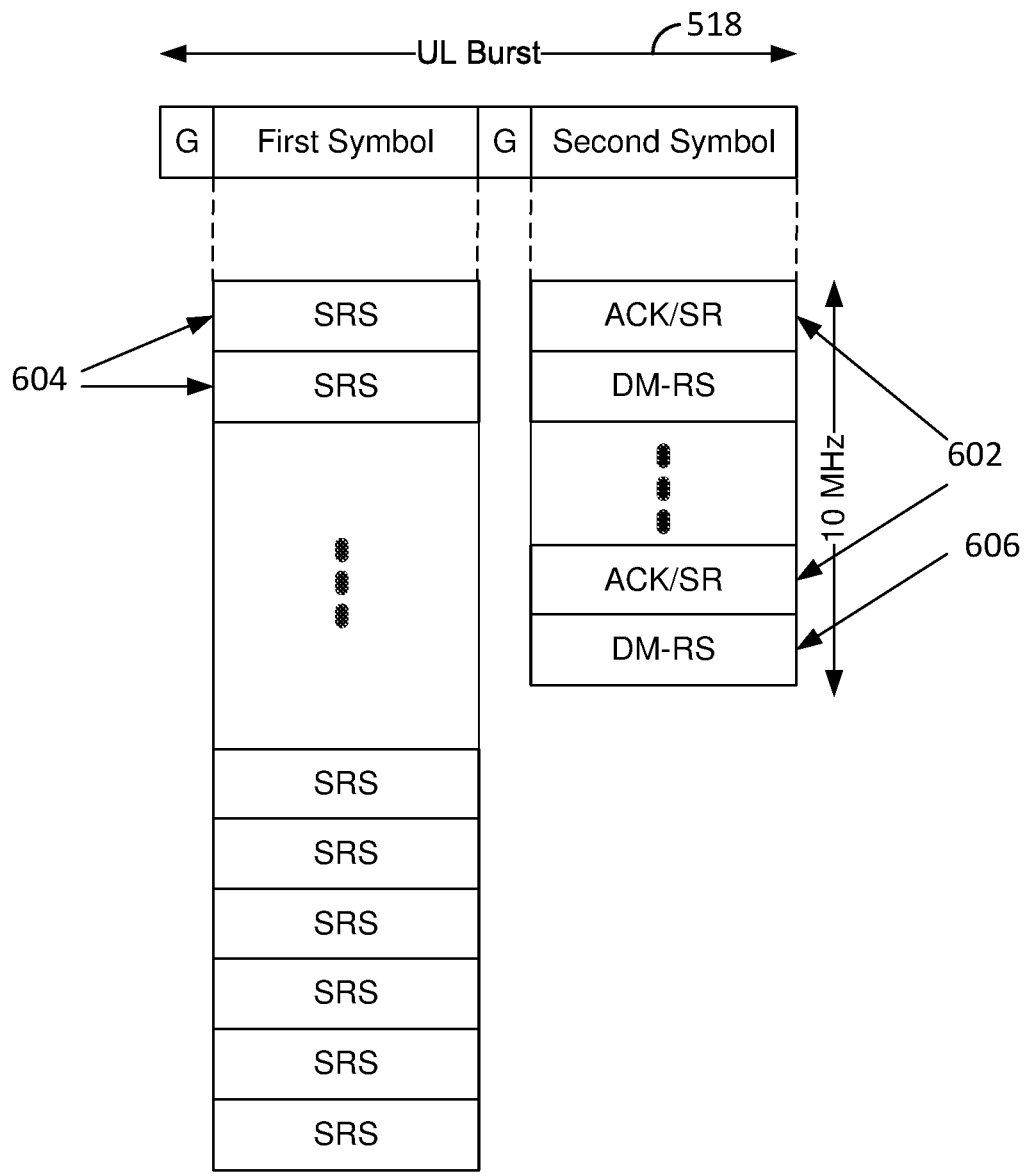
FIG. 6 is a schematic diagram illustrating a structure of a common uplink burst in a decoupled mode according to some embodiments of the disclosure.
Figure 7:
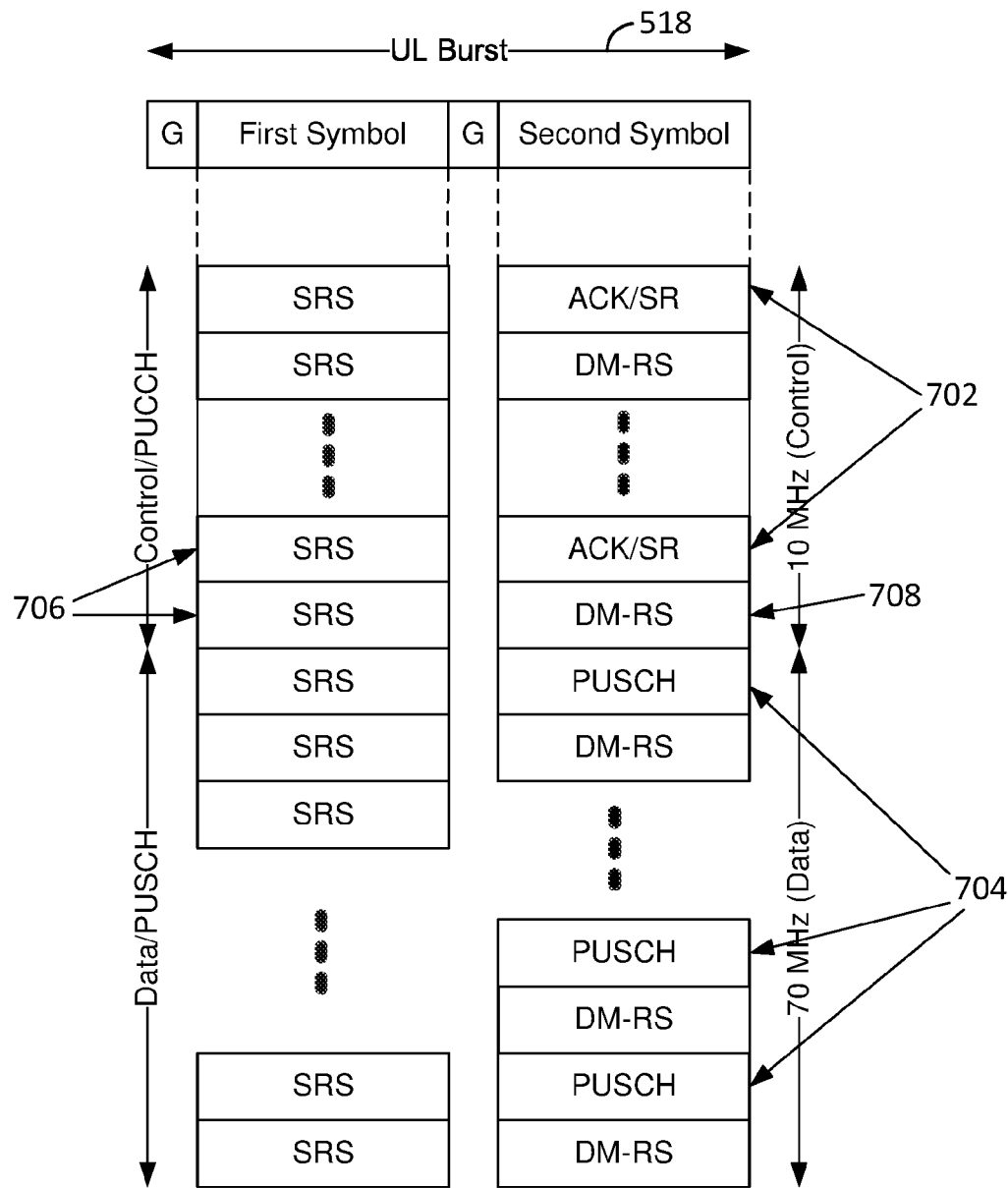
FIG. 7 is a schematic diagram illustrating a structure of a common uplink burst in a decoupled mode according to some embodiments of the disclosure.

FIGS. 6 and 7 are schematic illustrations showing additional details of the common UL burst 518 as it may be structured for transmissions in the decoupled mode, according to some aspects of the present disclosure. While these illustrations provide exemplary bandwidth figures, it will be understood that the specific values for the bandwidth for the control region (illustrated as 10 MHz) and the data region (illustrated as 70 MHz) are merely illustrative in nature, and any suitable bandwidth for either region may be utilized in a particular implementation within the scope of the present disclosure. Furthermore, the location of the control region and data region may vary from the illustrated examples. That is, while the illustrations show the control region at the top or upper portion of the resource block and the data region at the bottom or lower portion of the resource block, these can be rearranged within the scope of the disclosure. Furthermore, while the illustrations show the control region and the data region each being fully contiguous, this is not necessary, and within the scope of the disclosure, one or both of the control and/or data regions may be discontinuous, occupying two or more separate portions of the resource block.

FIGS. 6 and 7 show two different optional formats for the common UL burst 518 in decoupled mode. In the first format, in FIG. 6, only control information 602 (e.g., ACK/SR) is carried in the common UL burst. In the second format, in FIG. 7, control information 702 (e.g., ACK/SR) and data information 704 (e.g., PUSCH) are both carried in the common UL burst. In various aspects of the disclosure, decoupled mode transmissions may include control information within the control region, and any suitable amount of data within the data region. That is, in some aspects of the disclosure, in a common UL burst 518 configured for decoupled mode, the control region may have a fixed bandwidth, while the data region may have a variable bandwidth. For example, as in the first example in FIG. 6, a decoupled mode transmission may include no data information in the data region (i.e., no data region). In another example, as in the second example in FIG. 7, a decoupled mode transmission may include sufficient data information in the data region to completely fill all subcarriers in the data region. In other examples, any amount of data information between these examples may be transmitted in a particular common UL burst. As described in further detail below, the exact bandwidth of the data region, and its allocation among different users making common UL burst transmissions in decoupled mode, may be controlled by the scheduling entity (e.g., eNB) and communicated to the users or subordinate entities (e.g., UEs) utilizing a scheduling grant.

In some examples, a typical symbol may have a duration of about 30 µs or any suitable duration. However, in an aspect of the present disclosure, within the common UL burst, some symbols may be shortened relative to other symbols. As an example, in the illustrations of FIGS. 6 and 7, two short symbols (first symbol and second symbol) may be scaled to occupy altogether only the 30 µs common UL burst region 518. However, as already mentioned above, a common UL burst may include any suitable number of symbol periods, and any suitable scaling of symbols relative to nominal symbol timing may be utilized.

In the illustrated examples, in FIGS. 6 and 7, the first symbol within the common UL burst may include a sounding reference signal (SRS) 604 and 706, and the second symbol within the common UL burst may include control (e.g., ACK/SR 602, 702) and/or data information (e.g., PUSCH 704). The SRS is essentially a pilot transmitted by the scheduled device (e.g., a UE), to enable the base station or scheduling entity to sense (or sound) the channel for the purpose of configuring and scheduling downlink transmissions.

Here, the SRS is illustrated as a wideband signal, taking up the entire band (or all subcarriers). This is merely one example though, and it may be assumed that the transmitting subordinate entity (e.g., UE) can support such a transmission across the entire band or all subcarriers. Support of such a wideband transmission may be eased to some extent for UEs that are at or near the cell center. Transmission of the SRS in this wideband format can enable the receiving device (e.g., the scheduling entity or eNB) to sound the channel in one shot, saving time relative to the transmission of multiple SRSes in different portions or subcarriers of the band. In a further aspect of the disclosure, the SRS may be mixed or coded with a UE-specific scrambling code. In this way, the receiving scheduling entity (e.g., eNB) may be enabled to separate the SRS transmissions from different users or devices utilizing conventional CDMA techniques, known to those of ordinary skill in the art.

The control and data information in the second symbol may include the PUCCH for carrying time- or latency-sensitive control information such as packet acknowledgments (ACK), scheduling requests (SR), etc., and in some examples, the PUSCH for carrying uplink data. In the illustrated example, the PUCCH and the PUSCH are separated from one another by frequency. That is, these respective channels may be frequency-division-multiplexed within a single (one or more) symbol durations within the common UL burst. In this way, a transmission from the PUCCH/PUSCH of a high-power user may have less of an impact on the scheduling entity's reception of other users' transmissions of the PUSCH on different subcarriers.

As illustrated in FIGS. 6 and 7, the DM-RS pilot 606, 708 is shown taking every other subcarrier across the band. However, aspects of the present disclosure may utilize other configurations for the DM-RS, and the DM-RS need not necessarily occupy half of the tones or subcarriers across the band, and may occupy 25%, or any suitable proportion of the entire band.

In an aspect of the present disclosure, the PUCCH and the PUSCH may each have separate demodulation reference signals (DM-RS). That is, one pilot or DM-RS may be transmitted along with the control information bits in the PUCCH, while a second pilot or DM-RS may be transmitted along with the data information bits in the PUSCH. The illustration shows one set of DM-RS pilots being transmitted within every other subcarrier in the PUCCH (control) region, and another set of DM-RS pilots being transmitted within every other subcarrier in the PUSCH (data) region. However, as indicated above, other arrangements of the DM-RS within each region may vary from this example in a particular implementation.

In a still further aspect of the disclosure, for transmitting devices that include multiple antennas, such as those configured for beamforming and/or MIMO, each transmitting antenna may transmit its own DM-RS, different from the DM-RS transmitted by other antennas. That is, to best facilitate such uplink MIMO transmissions, the receiving device may need to differentiate different pilots (DM-RS signals) from different transmit antennas. According to an aspect of the present disclosure, code division multiplexing (CDM) may be utilized by the transmitting device (e.g. a UE or subordinate entity) to enable this differentiation between the pilots transmitted by different antennas. That is, these pilots transmitted from two different antennas may be scrambled by two different scrambling codes, and then transmitted at the same time, and within the same subcarrier. However, the receiving scheduling entity (e.g., eNB) is enabled to differentiate the different pilots from the different transmit antennas utilizing conventional code-division multiplexing procedures, well-known to those of ordinary skill in the art.

Within any given symbol, only a limited amount of resources are available to carry information. By taking some of the tones or subcarriers out of the available resources to dedicate those tones or subcarriers for pilot transmissions (e.g., SRS and DM-RS), even less resources are available to be dedicated for data information. For this reason, it is desired not to even further divide these resources to provide for different pilot transmissions for each of multiple antennas for uplink MIMO transmissions. Thus, when pilot tones such as the DM-RS are utilized, they may occupy the same time-frequency resources, but may be differentiated utilizing different scrambling codes as described above.

If the scheduling entity (e.g., eNB) schedules two users (e.g. UEs) to send the data information on the PUSCH, then these users may be scheduled, so that each of the users utilize designated resources identified by the scheduling entity. This scheduling information may be communicated to the users or subordinate entity utilizing scheduling grants, which may be unicast or broadcast messages, or any other suitable control channel transmission format configured to convey the scheduling grant. The scheduling grant may be carried in the PDCCH (e.g., PDCCH 510 and 514 of FIG. 5).

Figure 8:
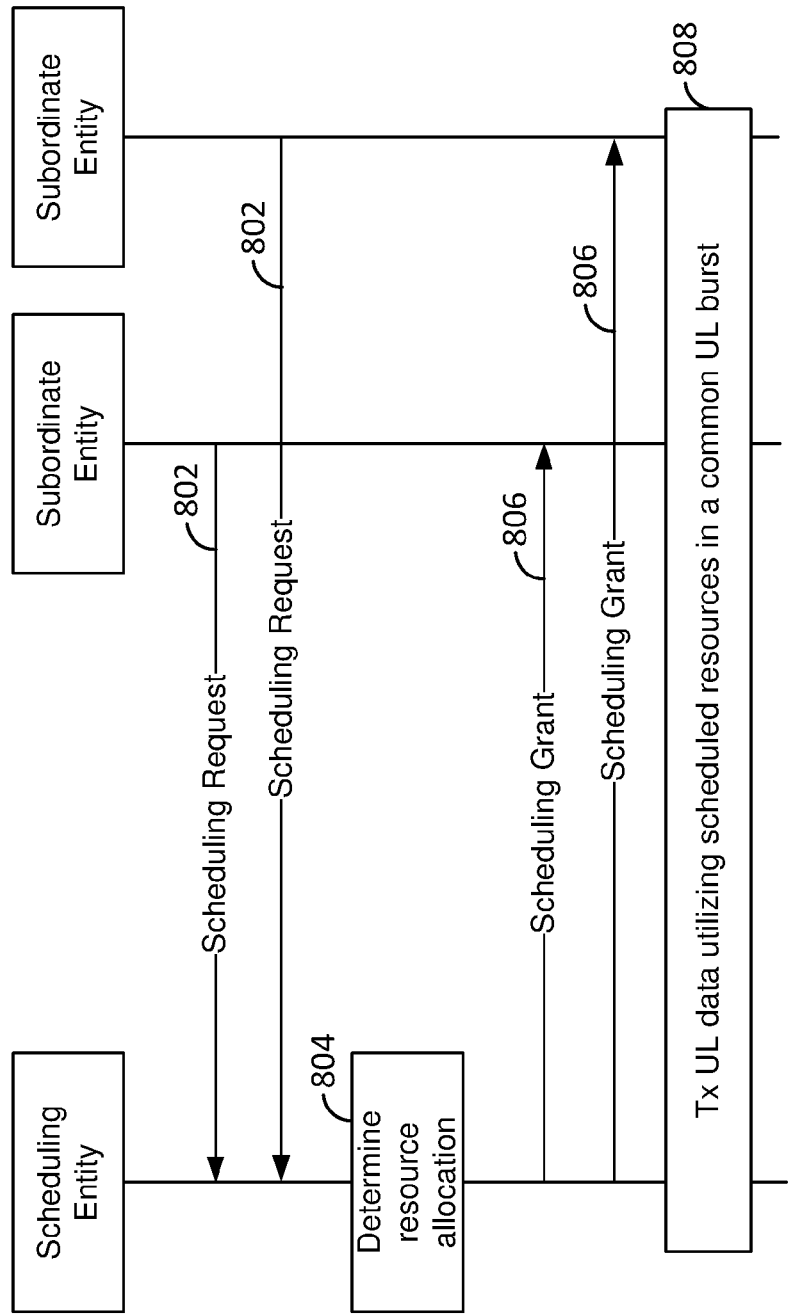
FIG. 8 is a signal flow diagram illustrating subordinate entities requesting resources in a common uplink (UL) burst from a scheduling entity according to some embodiments of the disclosure.

Further, referring to FIG. 8, when a subordinate entity (e.g., UE) has UL data to transmit, and wishes to request resources on the PUSCH in the common UL burst, the subordinate entity may transmit a scheduling request (SR) 802 within the PUCCH region (see FIGS. 6 and 7) of the common UL burst. That is, in one subframe, within the common UL burst, a subordinate entity may transmit the scheduling request 802 in the control region, e.g., utilizing the PUCCH. In response, the scheduling entity (e.g., eNB) may determine a suitable resource allocation 804 for the requesting subordinate entity based on a variety of factors or parameters. For example, the scheduling entity may consider the network loading or how occupied the common UL burst is with other users' transmissions; the nature or volume of data the subordinate entity is requesting to transmit; and the characteristics of the SRS received from the requesting scheduling entity. The scheduling entity may transmit a scheduling grant 806 utilizing any suitable transmission channel and format to the subordinate entity to identify the scheduled or allocated resources within the common UL burst of one or more subframes. Accordingly, the subordinate entity may transmit 808 its UL data in the data region, e.g., the PUSCH of a common UL burst, utilizing the scheduled resources. In this way, interference or collisions between subordinate entities configured to transmit utilizing the decoupled mode, which may be relatively high-power transmissions, may be reduced or eliminated.

On the other hand, unlike the data transmissions on the PUSCH within the common UL burst 518, the SRS and control transmissions (e.g., ACK/SR) on the PUCCH within the common UL burst from different users may share the same time-frequency resources and need not necessarily be scheduled. This is because the control transmissions and SRS may be power-controlled by the scheduling entity. That is, with suitable power control and in some examples interference cancellation techniques, the SRS and control transmissions from different users may simply be superposed over one another, and the scheduling entity may still be capable to receive and decode their respective transmissions. In some examples, these shared SRS/PUCCH transmissions may be differentiated from one user to another by configuring each user or subordinate entity to apply different scrambling sequences or codes to their transmissions, so that the resources are shared utilizing code division multiple access (CDMA). Accordingly, the receiving scheduling entity may be able to differentiate these users' transmissions utilizing conventional CDMA techniques known to those of ordinary skill in the art.

Waveforms for the Decoupled Mode

For the SRS, in an aspect of the present disclosure, a single carrier waveform may be utilized. For example, a single-carrier FDMA (SC-FDMA) waveform as utilized in conventional LTE transmissions, or any other suitable single carrier waveform may be utilized. That is, within a common UL burst 518, the SRS may be transmitted both by users that are close to the scheduling entity, and users that are far from the scheduling entity. In one example, the SRS transmitted by these different groups of users need not be different waveforms. Accordingly, a waveform may be selected that accommodates any bottleneck that may be caused by users at the cell edge, while providing sufficient functionality for users near the cell center. For cell edge users, the signal power may be relatively weak due to a large path loss. To increase the efficiency of the power amplifier for these users, a single carrier waveform may be used for the SRS, including those users operating in decoupled mode, close to the cell center. That is, use of such a single carrier waveform for SRS transmissions can save power, which may particularly be helpful for users at or near the cell edge.

For the SRS in the common UL burst, a single carrier waveform may be configured according to a Zadoff-Chu sequence, as utilized in present LTE standards and known to those of ordinary skill in the art. In other examples, any other suitable pseudo-random sequence may be utilized for the single carrier waveform in the common UL burst.

In a further aspect of the disclosure, the control region of the common UL burst 518, which may include the PUCCH, may utilize a discrete Fourier transform (DFT)-spread OFDM waveform. Further, the data region of the common UL burst, which may include the PUSCH, may utilize an OFDM waveform. That is, the PUCCH and PUSCH may utilize an OFDM waveform, which may include a cyclic prefix (CP) for relatively easy multiplexing of different channels. That is, it can be difficult to multiplex different channels utilizing FDM within the same symbol utilizing a single carrier waveform. Accordingly, because the common UL burst includes a symbol wherein the PUCCH and PUSCH are multiplexed, along with the DM-RS pilots, aspects of the present disclosure may utilize an OFDM waveform for this symbol or symbols.

The SRS region and the control region (PUCCH) within the common UL burst may be shared by a plurality of users (e.g., subordinate entities), with multiple access for these resources being achieved utilizing CDMA, as described above. That is, within the SRS region and the control region of the common UL burst, users may be differentiated by way of their respective use of different sequences in the code domain, with these sequences being, for example, allocated to the respective users by the network or scheduling entity. Moreover, as described above, different users may be suitably power controlled by the network or scheduling entity to further enable reception of each user's SRS/PUCCH transmissions.

In a still further aspect of the disclosure, the data region (e.g., PUSCH) within the common UL burst may be shared by a plurality of users (e.g., subordinate entities), with multiple access for these resources being achieved utilizing OFDMA. That is, within the data region of the common UL burst, users may be differentiated by way of their respective use of different frequency subcarriers, with the selection of the subcarrier or subcarriers to use for their data transmissions being made according to a scheduling grant transmitted to those respective users from the scheduling entity. In some examples, the use of the PUSCH in the common UL burst for uplink data transmissions may be restricted only to users having sufficient power headroom (e.g., available power headroom greater than a threshold). Further, the use of the PUSCH in the common UL burst for uplink data transmissions may be limited only to users having uplink payload data that requires low latency (e.g., lower latency than would otherwise be available from use of a data region of a regular UL burst, e.g., in an UL-centric subframe).

Figure 9:
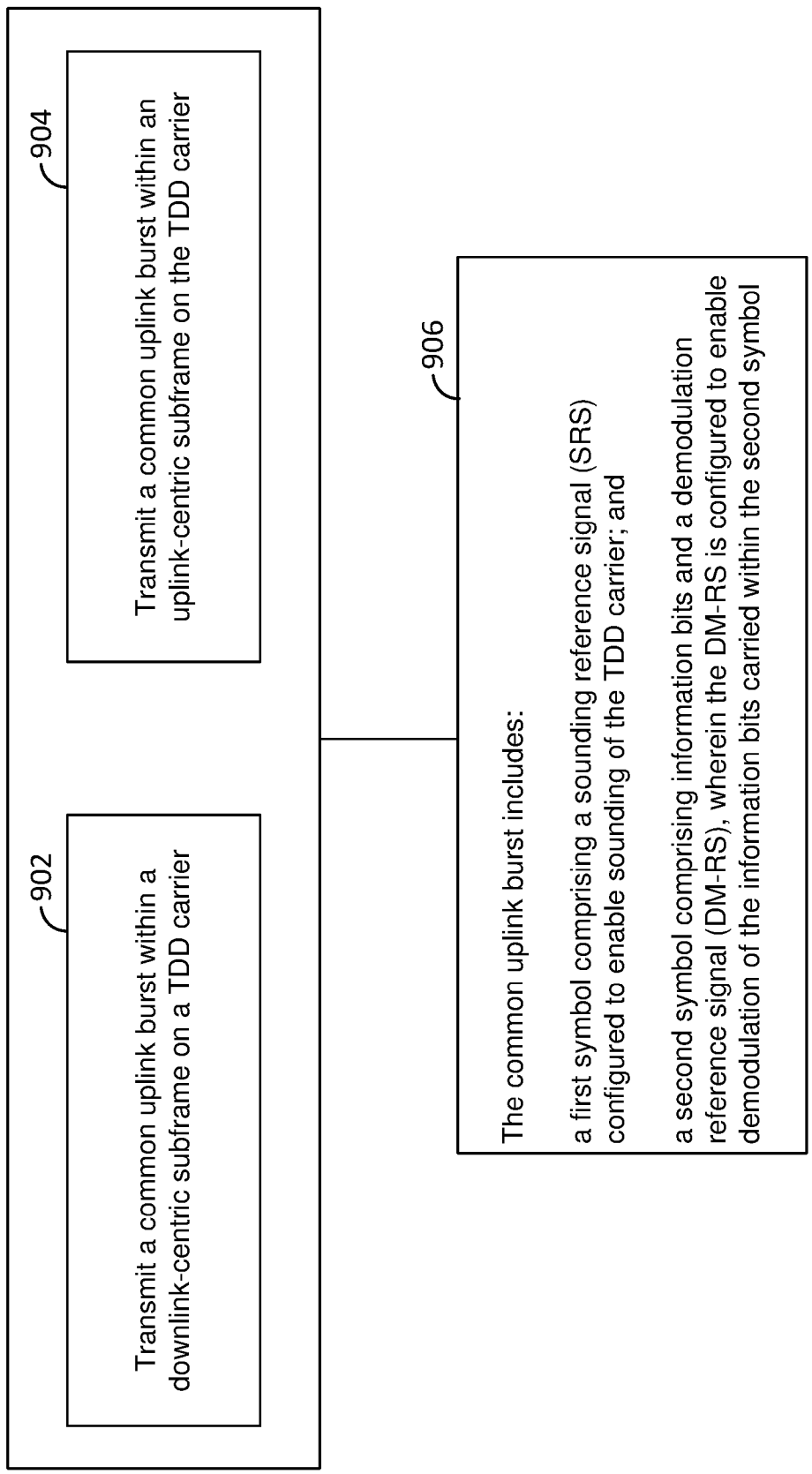
FIG. 9 is a diagram illustrating a method of operating a subordinate entity for wireless communication over a time division duplex (TDD) carrier in accordance with an aspect of the disclosure.
Figure 10:
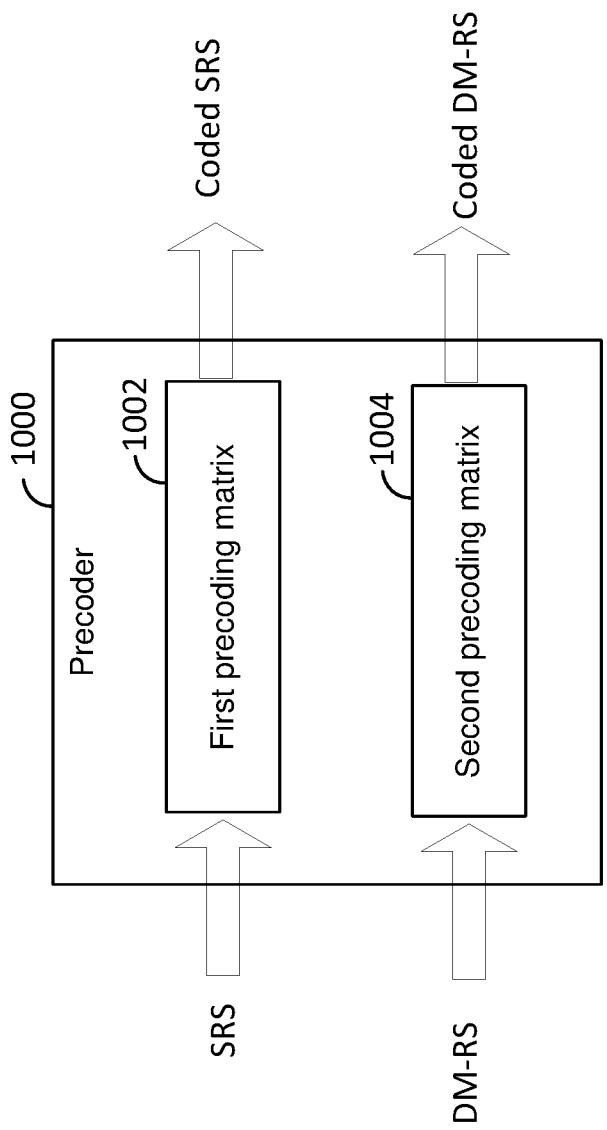
FIG. 10 is a diagram illustrating a precoding method of a sounding reference signal (SRS) and a demodulation reference signal (DM-RS) in accordance with an aspect of the disclosure.

FIG. 9 is a diagram illustrating a method of operating a subordinate entity for wireless communication over a time division duplex (TDD) carrier in accordance with an aspect of the disclosure. In some examples, this method may be performed using any of the subordinate entities illustrated in FIGS. 1-4 and 8, or any wireless communication devices.

According to the method of FIG. 9, a subordinate entity may utilize a common UL burst block 320 (see FIG. 3) to transmit a common uplink burst within a downlink-centric subframe 902 and an uplink-centric subframe 904 on a TDD carrier. For example, the subordinate entity may utilize a DL-centric subframe block 322 to prepare and transmit a common uplink burst 518 in a DL-centric subframe 504 (see FIG. 5). For example, the subordinate entity may utilize an UL-centric subframe block 324 to prepare and transmit a common uplink burst in an UL-centric subframe 502 (see FIG. 5). The common uplink burst may be the same as the common UL burst 518 described in relation to FIGS. 5-7. For example, the uplink burst may be transmitted in each of the DL-centric subframe and UL-centric subframe (e.g., frame 500 of FIG. 5). In other examples, the common uplink burst may be transmitted in any desired number (e.g., more than 50% of total subframes) of subframes including DL-centric subframes and UL-centric subframes to provide more UL transmission opportunity.

The uplink burst includes a first symbol that includes a sounding reference signal (SRS) configured to enable sounding of the TDD carrier, and a second symbol that includes information bits and a demodulation reference signal (DM-RS) similar to those illustrated in FIGS. 6 and 7. The DM-RS is configured to enable demodulation of the information bits (e.g., PUSCH) carried within the second symbol. The SRS and DM-RS may be precoded differently. For example, in FIG. 10, the subordinate entity may utilize a precoder 1000 to apply a first precoding matrix 1002 to the SRS, and apply a second precoding matrix 1004 that is different from the first precoding matrix 1002 to the DM-RS. The separate precoding of the SRS and DM-RS allow control and/or data information to be transmitted utilizing multiple input multiple output (MIMO).

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As those skilled in the art will readily appreciate, various aspects described throughout this disclosure may be extended to any suitable telecommunication system or systems, network architectures, and communication standards. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), LTE-U, CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method operable at a subordinate entity for wireless communication over a time division duplex (TDD) carrier, the method comprising:
   transmitting an uplink burst within a downlink-centric subframe and an uplink-centric subframe on the TDD carrier, wherein the uplink burst comprises:
      a first symbol comprising a sounding reference signal (SRS) configured to enable sounding of the TDD carrier; and
      a second symbol comprising information bits and a demodulation reference signal (DM-RS), wherein the DM-RS is configured to enable demodulation of the information bits carried within the second symbol.

2. The method of claim 1, further comprising:
   applying a first precoding matrix to the SRS; and
   applying a second precoding matrix, different from the first precoding matrix, to the DM-RS.

3. The method of claim 1, further comprising:
   applying a scrambling code to the SRS, the scrambling code configured to enable code division multiple access (CDMA) among a plurality of subordinate entities.

4. The method of claim 1, wherein the first symbol of the uplink burst is configured with a single carrier waveform; and
   wherein the second symbol of the uplink burst is configured with an orthogonal frequency division multiple access (OFDMA) waveform comprising a plurality of subcarriers.

5. The method of claim 4, wherein the TDD carrier comprises a plurality of resource blocks, each resource block comprising time-frequency resources including a set of subcarriers;
   wherein the SRS in the first symbol of the uplink burst spans all of the subcarriers within a resource block on the TDD carrier; and
   wherein the second symbol of the uplink burst further comprises a control region spanning a first portion of the subcarriers within the resource block on the TDD carrier, the first portion of the subcarriers being less than all of the subcarriers.

6. The method of claim 5, wherein the second symbol of the uplink burst further comprises a data region spanning a second portion of the subcarriers within the resource block of the TDD carrier, first portion and the second portion together being less than or equal to all of the subcarriers.

7. The method of claim 6, wherein the control region comprises a scheduling request (SR) configured to request from a scheduling entity an allocation of time-frequency resources in a subsequent uplink burst, the method further comprising:
   receiving a scheduling grant from the scheduling entity in response to the SR, the scheduling grant indicating a grant of the time-frequency resources in the subsequent uplink burst.

8. The method of claim 7, further comprising transmitting the subsequent uplink burst in one of an uplink-centric subframe or a downlink-centric subframe on the TDD carrier, the subsequent uplink burst comprising data information utilizing the granted time-frequency resources.

9. A subordinate entity configured for wireless communication over a time division duplex (TDD) carrier, comprising:
   a processor;
   a memory communicatively coupled to the processor; and
   a transceiver communicatively coupled to the processor,
   wherein the processor and the memory are configured to:
      transmit an uplink burst within a downlink-centric subframe and an uplink-centric subframe on the TDD carrier, wherein the uplink burst comprises:
         a first symbol comprising a sounding reference signal (SRS) configured to enable sounding of the TDD carrier; and
         a second symbol comprising information bits and a demodulation reference signal (DM-RS), wherein the DM-RS is configured to enable demodulation of the information bits carried within the second symbol.

10. The subordinate entity of claim 9, wherein the processor and the memory are further configured to:
    apply a first precoding matrix to the SRS; and
    apply a second precoding matrix, different from the first precoding matrix, to the DM-RS.

11. The subordinate entity of claim 9, wherein the processor and the memory are further configured to:
    apply a scrambling code to the SRS, the scrambling code configured to enable code division multiple access (CDMA) among a plurality of subordinate entities.

12. The subordinate entity of claim 9,
    wherein the first symbol of the uplink burst is configured with a single carrier waveform; and
    wherein the second symbol of the uplink burst is configured with an orthogonal frequency division multiple access (OFDMA) waveform comprising a plurality of subcarriers.

13. The subordinate entity of claim 12,
    wherein the TDD carrier comprises a plurality of resource blocks, each resource block comprising time-frequency resources including a set of subcarriers;
    wherein the SRS in the first symbol of the uplink burst spans all of the subcarriers within a resource block on the TDD carrier; and wherein the second symbol of the uplink burst further comprises a control region spanning a first portion of the subcarriers within the resource block on the TDD carrier, the first portion of the subcarriers being less than all of the subcarriers.

14. The subordinate entity of claim 13, wherein the second symbol of the uplink burst further comprises a data region spanning a second portion of the subcarriers within the resource block of the TDD carrier, first portion and the second portion together being less than or equal to all of the subcarriers.

15. The subordinate entity of claim 14, wherein the control region comprises a scheduling request (SR) configured to request from a scheduling entity an allocation of time-frequency resources in a subsequent uplink burst,
wherein the processor and the memory are further configured to:
receive a scheduling grant from the scheduling entity in response to the SR, the scheduling grant indicating a grant of the time-frequency resources in the subsequent uplink burst.

16. The subordinate entity of claim 15, wherein the processor and the memory are further configured to:
transmit the subsequent uplink burst in one of an uplink-centric subframe or a downlink-centric subframe on the TDD carrier, the subsequent uplink burst comprising data information utilizing the granted time-frequency resources.

17. A subordinate entity configured for wireless communication over a time division duplex (TDD) carrier, comprising:
means for transmitting an uplink burst within a downlink-centric subframe on the TDD carrier; and
means for transmitting the uplink burst within an uplink-centric subframe on the TDD carrier,
wherein the uplink burst comprises:
a first symbol comprising a sounding reference signal (SRS) configured to enable sounding of the TDD carrier; and
a second symbol comprising information bits and a demodulation reference signal (DM-RS), wherein the DM-RS is configured to enable demodulation of the information bits carried within the second symbol.

18. The subordinate entity of claim 17, further comprising:
means for applying a first precoding matrix to the SRS; and
means for applying a second precoding matrix, different from the first precoding matrix, to the DM-RS.

19. The subordinate entity of claim 17, wherein the TDD carrier comprises a plurality of resource blocks, each resource block comprising time-frequency resources including a set of subcarriers;
wherein the SRS in the first symbol of the uplink burst spans all of the subcarriers within a resource block on the TDD carrier; and
wherein the second symbol of the uplink burst further comprises a control region spanning a first portion of the subcarriers within the resource block on the TDD carrier, the first portion of the subcarriers being less than all of the subcarriers.

20. The subordinate entity of claim 19, wherein the second symbol of the uplink burst further comprises a data region spanning a second portion of the subcarriers within the resource block of the TDD carrier, first portion and the second portion together being less than or equal to all of the subcarriers.

* * * * *